United States Patent
He et al.

(10) Patent No.: US 7,200,624 B2
(45) Date of Patent: Apr. 3, 2007

(54) SYSTEMS AND METHODS FOR VERSIONING BASED TRIGGERS

(75) Inventors: Gang He, Woodinville, WA (US); Michael J. Zwilling, Redmond, WA (US)

(73) Assignee: Microsoft Corporation, Redmond, WA (US)

( * ) Notice: Subject to any disclaimer, the term of this patent is extended or adjusted under 35 U.S.C. 154(b) by 22 days.

(21) Appl. No.: 10/889,415

(22) Filed: Jul. 12, 2004

(65) Prior Publication Data
US 2005/0216520 A1     Sep. 29, 2005

Related U.S. Application Data

(60) Provisional application No. 60/557,286, filed on Mar. 29, 2004.

(51) Int. Cl.
*G06F 12/00* (2006.01)
*G06F 17/30* (2006.01)

(52) U.S. Cl. .................. 707/203; 707/100; 707/202

(58) Field of Classification Search .................. 707/1, 707/203, 202, 100
See application file for complete search history.

(56) References Cited

U.S. PATENT DOCUMENTS

| | | |
|---|---|---|
| 5,729,744 A | 3/1998 | Gerken et al. |
| 6,182,086 B1 | 1/2001 | Lomet et al. |
| 6,584,476 B1 * | 6/2003 | Chatterjee et al. .......... 707/203 |
| 6,636,846 B1 | 10/2003 | Leung et al. |
| 2003/0069902 A1 | 4/2003 | Narang et al. |
| 2004/0236763 A1 | 11/2004 | Krishnamoorthy et al. |

OTHER PUBLICATIONS

Edward Sciore, Using Annotations to Support Multiple Kinds of versioning in an Object-Oriented Database System, ACM Transactions on Database Systems, 1991, 16(3), pp. 417-438.
Umeshwar Dayal, et al., Organizing Long-Running Activities with Triggers and Transactions, ACM, 1990, pp. 204-214.
Louiqa Raschid, et al., Semantics for Update Rule Programs and Implementation in a Relational Database Management System, ACM Transactions on Database Systems, 1996, 22(4), pp. 526-571.
Randy H. Katz, Toward a Unified Framework for Version Modeling in Engineering Databases, ACM Computing Surveys, 1990, 22(4), pp. 375-408.
Donald Cohen, Compiling Complex Database Transition Triggers, ACM, 1989, pp. 225-234.
Kapali P. Eswaran, Aspects of a Trigger Subsystem in an Integrated Database System, IBM Research Laboratory, San Jose, pp. 243-250, no date.
Reidar Conradi, et al., Version Models for Software Configuration Management, ACM Computing Surveys, 1998, 30(2), pp. 232-282.

(Continued)

*Primary Examiner*—Sam Rimell
*Assistant Examiner*—Jacob F. Betit
(74) *Attorney, Agent, or Firm*—Amin, Turocy, & Calvin, LLP

(57) ABSTRACT

A system and/or methodology to track and organize database application data in response to a delete, insert or update procedure. More specifically, a system and/or methodology that employs a version-based retention and linkage approach with respect to triggering implementations is provided.

24 Claims, 9 Drawing Sheets

OTHER PUBLICATIONS

N. H. Gehani, et al., Event Specification in an Active Object-Oriented Database, ACM SIGMOD, 1992, pp. 81-90, ACM, CA, USA.

Jennifer Widom, et al., Set-Oriented Production Rules in Relational Database Systems, 1990, pp. 259-270, ACM.

Thomas Gustafsson, et al., Dynamic On-Demand Updating of Data in Real-Time Database Systems, SAC '04, Mar. 2004, pp. 846-853, ACM.

Eric N. Hanson, et al., Timer-Driven Database Triggers and Alerters: Semantics and a Challenge, SIGMOD Record, Dec. 1999, pp. 11-16, vol. 28 No. 4.

Donald Cohen, Compiling Complex Database Transition Triggers, 1989, pp. 225-234, ACM.

Francois Llirbat, et al., Eliminating Costly Redundant Computations From SQL Trigger Executions, SIGMOD '97, 1997, pp. 428-439, ACM, AZ, USA.

Oscar Diaz, et al., EXACT: An Extensible Approach to Active Object-Oriented Databases, The VLDB Journal, 1997, pp. 282-295, vol. 6, Springer-Verlag.

Brad Adelberg, et al., The STRIP Rule System for Efficiently Maintaining Derived Data, SIGMOD '97, 1997, pp. 147-157, ACM, AZ, USA.

* cited by examiner

SYSTEMS AND METHODS FOR VERSIONING BASED TRIGGERS

CROSS-REFERENCE TO RELATED APPLICATIONS

This application claims the benefit, under 35 U.S.C. § 119(e), of U.S. Provisional Patent Application Ser. No. 60/557,286 entitled Systems and Methods for Versioning Based Triggers and filed on Mar. 29, 2004. This application is also related to U.S. patent application Ser. No. 10/445,095, entitled "System and Method for Identifying and Storing Changes Made to a Table", and filed on May 22, 2003. The entireties of these applications are incorporated herein by reference.

TECHNICAL FIELD

The present invention relates generally to computer systems, and more specifically to a system and/or method that relates to version-based linkages and implementations of triggers in a data base management system (DBMS).

BACKGROUND OF THE INVENTION

With the technological advances in database management systems (DBMSs), there is an ongoing and increasing need to increase performance efficiency. Specifically, there is an ongoing and increasing need to increase database performance as related to triggers.

Generally, in a DBMS the current version of data is stored in a "base" table. Each row in the base table can be changed as the result of a delete, insert or update operation. When a row is changed, the change can be stored in a set of temporary "transition" tables. Such a set of transition tables can be automatically created and managed by the DBMS. The set of transition tables may include a "delete" table, which stores rows deleted from the base table, and an "insert" table, which stores rows inserted into the base table. If a row is updated, the previous version of the row is stored in the delete table, and the current version of the row is stored in the insert table.

The transition tables enable the DBMS to test the effects of changes and to set conditions for trigger actions. Specifically, transition tables extend referential integrity between tables, change data in a base table underlying a particular view, check for errors and take action based on a detected error, and find the difference between the state of a table before and after a change and take action based on the difference.

A trigger is a special type of stored procedure that is executed when an insert, update or delete statement modifies one or more rows in a table. Because a DBMS (e.g., SQL Server) can call a trigger for every specified operation on a particular table, one can use triggers to extend the built-in integrity and data manipulation features of the DBMS. Traditionally, trigger, also referred to as after-trigger, implementations were executed by conducting a scan of the transaction log to retrieve old and new images of records. However, traditional log based implementations of after-triggers presented a number of problems. For example, the log inherently created a processing bottleneck. Although, a log approach may be sufficient in some sequential write applications, it is not particularly useful in random read applications. This bottleneck characteristic is at least in part attributed to the lack of scalability of the log scan after-trigger implementation.

Another pitfall of the conventional log scan approach is that the log is not buffer pool backed. As will be appreciated, reading from an inserted/deleted table likely involves a large amount of input/output (I/O) processes. Finally, large object (LOB) database field access is not supported in after-trigger through conventional log based implementations. Due to these limitations of the traditional log scan approach, recent efforts and developments have been directed to versioning-based implementations. Existing versioning-based after-trigger implementations rely on versioning to provide old and new images of records in a delta worktable. Accordingly, a delta worktable is maintained which stores key values of records which have been inserted, deleted or updated to identify records in the inserted/deleted tables.

Although these new implementations solved many of the problems of conventional log based approach, they are much slower than the log based approach. This deficiency stems from the cost associated with populating the delta worktable during a data manipulation language (DML) event as well as the cost to construct inserted/deleted tables during trigger body execution by joining the delta worktable and base table. Together this translates into one bookmark lookup plus a versioning store visit in the base table per row scanned in the delta worktable.

Even though attempts have been made via version-based implementations to reduce and/or mitigate the aforementioned concerns and to increase trigger efficiency, there is still a substantial unmet need for a system and/or methodology to employ a versioning-based implementation to create a more cost effective and efficient versioning-based after-trigger implementation.

SUMMARY OF THE INVENTION

The following presents a simplified summary of the invention in order to provide a basic understanding of some aspects of the invention. This summary is not an extensive overview of the invention. It is not intended to identify key/critical elements of the invention or to delineate the scope of the invention. Its sole purpose is to present some concepts of the invention in a simplified form as a prelude to the more detailed description that is presented later.

The present invention disclosed and claimed herein, in one aspect thereof, comprises a system and/or methodology to track and organize database application data in response to a delete, insert or update procedure. More specifically, an aspect of the present system employs a version-based retention and linkage approach with respect to triggering implementations. Various aspects of the present invention can improve performance of after-triggers (e.g., a commonly provided feature in database systems), which provide a method for a user of a database system to specify operations to be executed upon the act of updating, deleting, and/or inserting of rows in a database table. The after-trigger mechanism provides for "inserted" and "deleted" pseudo-tables that show the rows inserted, deleted, or updated by an operation on the base table. The pseudo-tables can be stored in a version store component.

Furthermore, particular aspects of the present invention concern a scanning mechanism (e.g., extended version scan (EVS)) for instantiating the rows applicable to the inserted and deleted pseudo-tables. It will be appreciated that the invention provides for significant performance advantages over two other conventional approaches namely, delta-tables and transaction log scans. A version store component is employed to retain previous versions of the records contained within the base table. In addition to the version store maintaining the old versions of the records and a linkage for different versions of the same key value, an additional linkage can be maintained to link versioned records with different key values generated within the same data modification statement to form an old image chain. To retrieve the old images from deleted table a scan can be implemented to retrieve all the version records in this chain.

To extend the concepts to an "inserted" table procedure, the new images of records can be pushed into the version store upon the data modification. Once the new image is in the version store, a similar linkage can be maintained to link new images of different key values under the same data modification statement to form a new image chain for inserted table.

In accordance with another aspect of the present invention, each insert, delete, and update statement has an internal structure, which can contain the current tails of the new and old image chains. During the statement, the tails in the internal structure can be maintained by each data modification operation, and when retrieving the rows from inserted and deleted tables, the tails in internal structure can be utilized to originate the scans to assist in triggering.

To the accomplishment of the foregoing and related ends, certain illustrative aspects of the invention are described herein in connection with the following description and the annexed drawings. These aspects are indicative, however, of but a few of the various ways in which the principles of the invention can be employed and the present invention is intended to include all such aspects and their equivalents. Other advantages and novel features of the invention will become apparent from the following detailed description of the invention when considered in conjunction with the drawings.

DETAILED DESCRIPTION OF THE INVENTION

Figure 1:
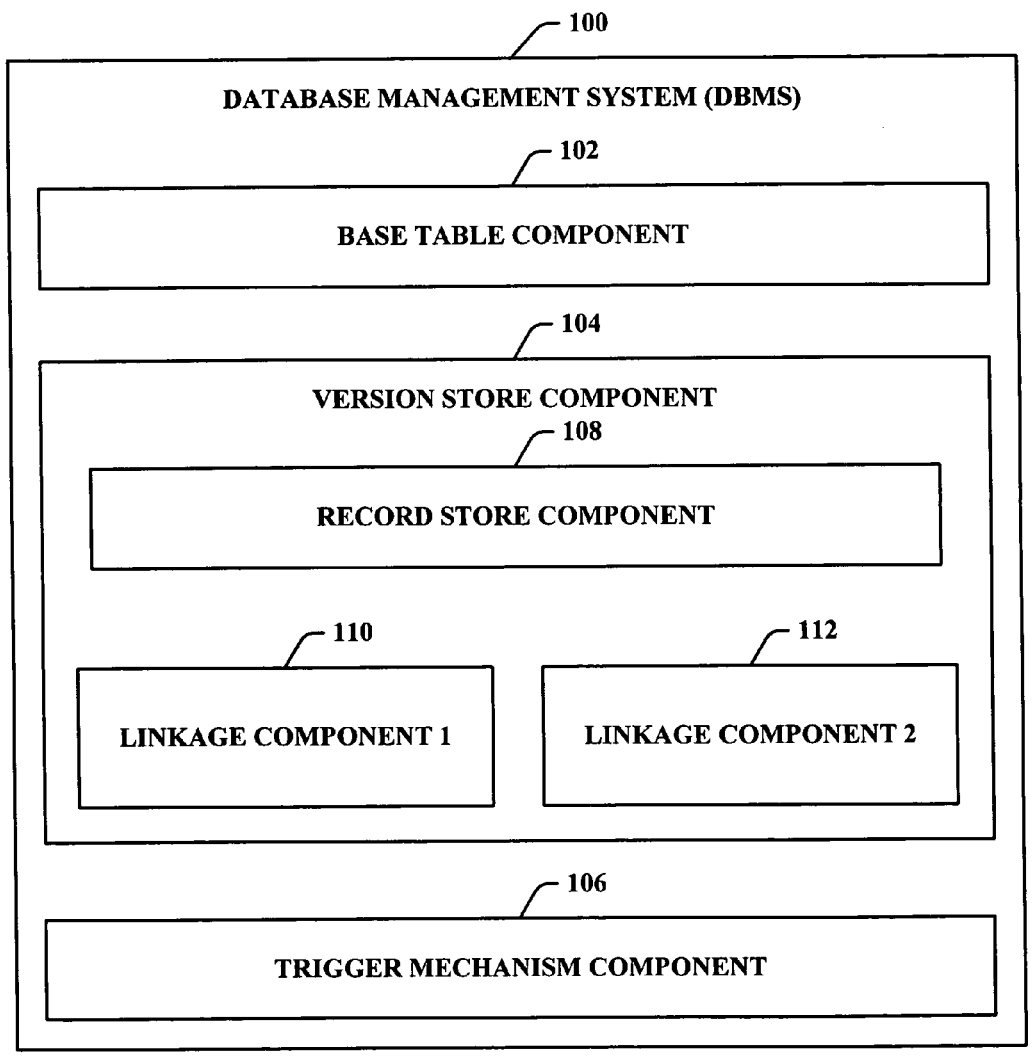
FIG. 1 illustrates a general component block diagram of a database management system (DBMS) in accordance with one aspect of the present invention.

The present invention is now described with reference to the drawings, wherein like reference numerals are used to refer to like elements throughout. In the following description, for purposes of explanation, numerous specific details are set forth in order to provide a thorough understanding of the present invention. It may be evident, however, that the present invention can be practiced without these specific details. In other instances, well-known structures and devices are shown in block diagram form in order to facilitate describing the present invention.

As used in this application, the terms "component" and "system" are intended to refer to a computer-related entity, either hardware, a combination of hardware and software, software, or software in execution. For example, a component can be, but is not limited to being, a process running on a processor, a processor, an object, an executable, a thread of execution, a program, and/or a computer. By way of illustration, both an application running on a server and the server can be a component. One or more components can reside within a process and/or thread of execution, and a component can be localized on one computer and/or distributed between two or more computers.

The present invention, in one aspect thereof, is directed toward a system and/or method to employ version-based implementations with respect to triggers in a database management system (DBMS). By way of example, one aspect of the present invention is directed toward employing a versioning-based triggering mechanism in relation to an SQL Server based application. Although aspects of the present invention are described herein with respect to the SQL Server DBMS, it will be appreciated that the concepts and innovations of the present invention can be applied to any known DBMS known in the art.

Particularly, to address the performance issues related to conventional after-trigger implementations, aspects of the present invention are directed toward an extended version scan (EVS) approach. This EVS approach includes the employment of a version store together with corresponding version record linkages which enable the system to access versions of rows via a reverse-linkage scan. The systems and methods used to facilitate the EVS approach are discussed in further detail below.

Referring initially to FIG. 1, a general block diagram of a DBMS 100 in accordance to an aspect of the present invention is shown. Generally, as illustrated in FIG. 1, the DBMS 100 can include a base table component 102, a version store component 104 and a trigger mechanism component 106. As discussed supra, the base table component 102 can contain a current version of data records. On the other hand, previous versions of each row of the data contained within the base table component 102 can be stored in the version store component 104.

An exemplary version store component 104 can include a record store component 108 which includes record version history, and multiple record linkage components 110, 112. Although only two linkage components 110, 112 are shown in FIG. 1, those skilled in the art will understand linkage components can be generated and/or stored in accordance with alternate aspects of the present invention. For example, if multiple data manipulation language (DML) statements are executed thereby creating multiple versions of records with different key values, it will be appreciated that a corresponding linkage chain can be stored to link the related records having different key values.

In addition to the version store component 104 maintaining the record store component 108 of version history and linkage component 110 corresponding to different record versions having the same key value (e.g., generated from the same DML statement) as the records in the base table component 102, an additional linkage component 112 can be maintained which represents a linkage of versioned records with different key values as related to the base table component 102. In other words, the records linked by linkage 112 have different key values corresponding to the specific DML statement employed to derive the records. Those skilled in the art will appreciate that records having different key values can be generated within the same DML statement to form an old image chain. Accordingly, in order to retrieve the old images corresponding to a deleted table, an EVS can be performed of all the version records linked in this chain 112.

Figure 2:
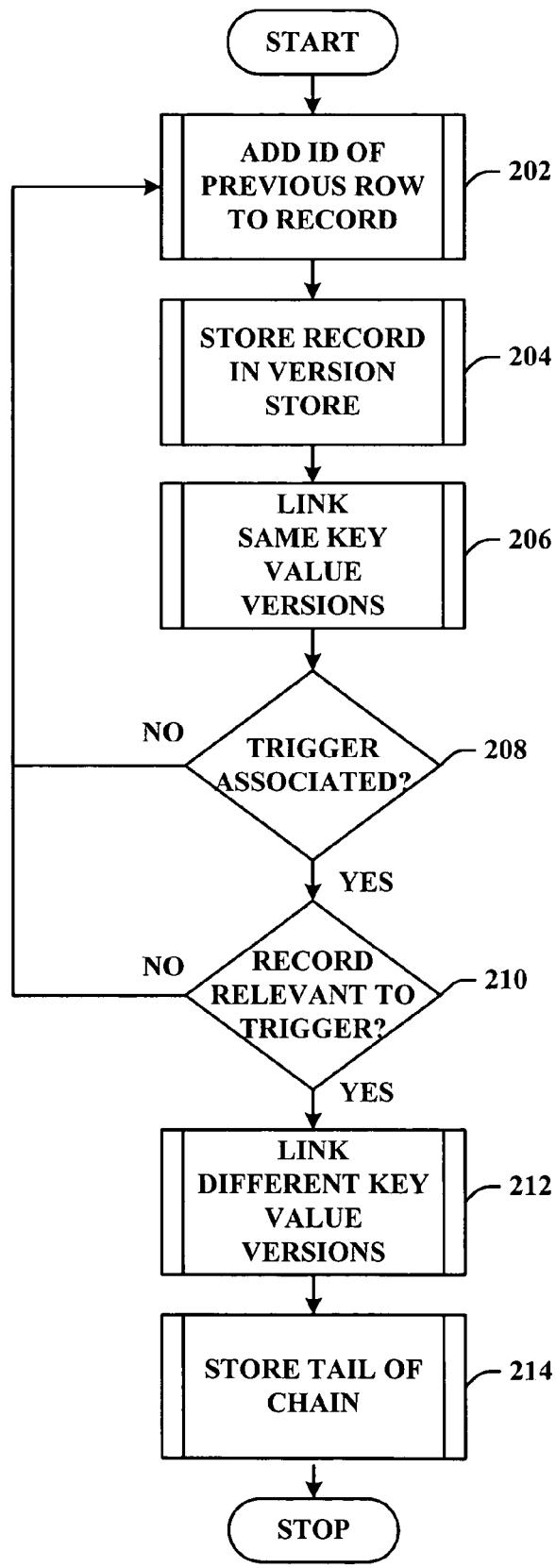
FIG. 2 illustrates one methodology to establish a version-based linkage upon execution of a data manipulation language (DML) event in accordance with an aspect of the present invention.

In accordance with an aspect of the present invention, FIG. 2 illustrates a simplified flow diagram depicting a methodology of establishing a version-based linkage upon execution of a DML event. While, for purposes of simplicity of explanation, the one or more methodologies shown herein, e.g., in the form of a flow chart, are shown and described as a series of acts, it is to be understood and appreciated that the present invention is not limited by the order of acts, as some acts may, in accordance with the present invention, occur in a different order and/or concurrently with other acts from that shown and described herein. For example, those skilled in the art will understand and appreciate that a methodology could alternatively be represented as a series of interrelated states or events, such as in a state diagram. Moreover, not all illustrated acts may be required to implement a methodology in accordance with the present invention.

Proceeding to 202, for each record deleted, inserted or updated as a result of the DML statement, the record identifier of the previous row in the corresponding version chain is added to the version record in conjunction with storage into the version store. This identifier can assist in linking records to form new/old image chains. It will also be appreciated that the record identifier can be any identifier known in the art capable of identifying the location of the row in the version store. For example, the record identifier can represent a page and slot identification in order to identify a specific record in a version store.

Next, at 204, the record is stored in the version store. As previously discussed, multiple versions of record images having the same or different key values can be stored in the version store. At 206. versions having the same key values are linked.

In accordance with an aspect of the present invention, only records relevant to a trigger are linked into the chains. By way of example, because version records corresponding to a secondary index do not participate in the inserted/deleted table, they are not linked into chains. As well, in the event a trigger is not present in conjunction with a table, the table's version records are not linked into chains.

At 208, the system determines if a trigger is associated to the table (e.g., deleted, inserted) which contains the record manipulated by the DML statement. If, at 208, the system determines that a trigger is not present, the system returns to 202 to store additional records into the version store. If, at 208, the system determines that a trigger is associated to the applicable table containing the record, the system determines if the particular record is relevant to the trigger at 210.

If, at 210, the system determines that the record is not relevant to the trigger, the system returns to 202 to store additional records into the version store. If, at 210, the system determines that the record is relevant to the trigger, the system proceeds to establish record linkages at 212. By way of example, if the relevant trigger is applicable to a "deleted" table and an "insert" DML statement is effected, the system will return to 202 from 210. Likewise, if the relevant trigger corresponds to an "inserted" table and a "delete" manipulation statement is executed, the system will determine that the particular row is not relevant to the trigger and return to 202.

It will be appreciated that an interface can be employed to inform the system whether a chain should be maintained during a DML event. For example, if there is no trigger on the table, the system will determine that no chain is to be maintained. Otherwise based on a trigger body analysis the system can determine to maintain a new image chain or old image chain or both.

Next, at 212, the system links different versions of images having a different key value as those in the base table. Finally, at 214, in order to identify specific versions and linkages, identifiers of the tail of individual linkages are stored for later retrieval in accordance with a scan and/or subsequent execution of a trigger. As illustrated by the methodology of FIG. 2, in accordance with the aspect of the present invention, only the tail identifier of linkages corresponding to rows having different key values and applicable to "deleted" and/or "inserted" tables will be stored. Those skilled in the art will understand that any data store mechanism or memory device can be used to effectuate the storage of the linkage tail identifiers.

Figure 3:
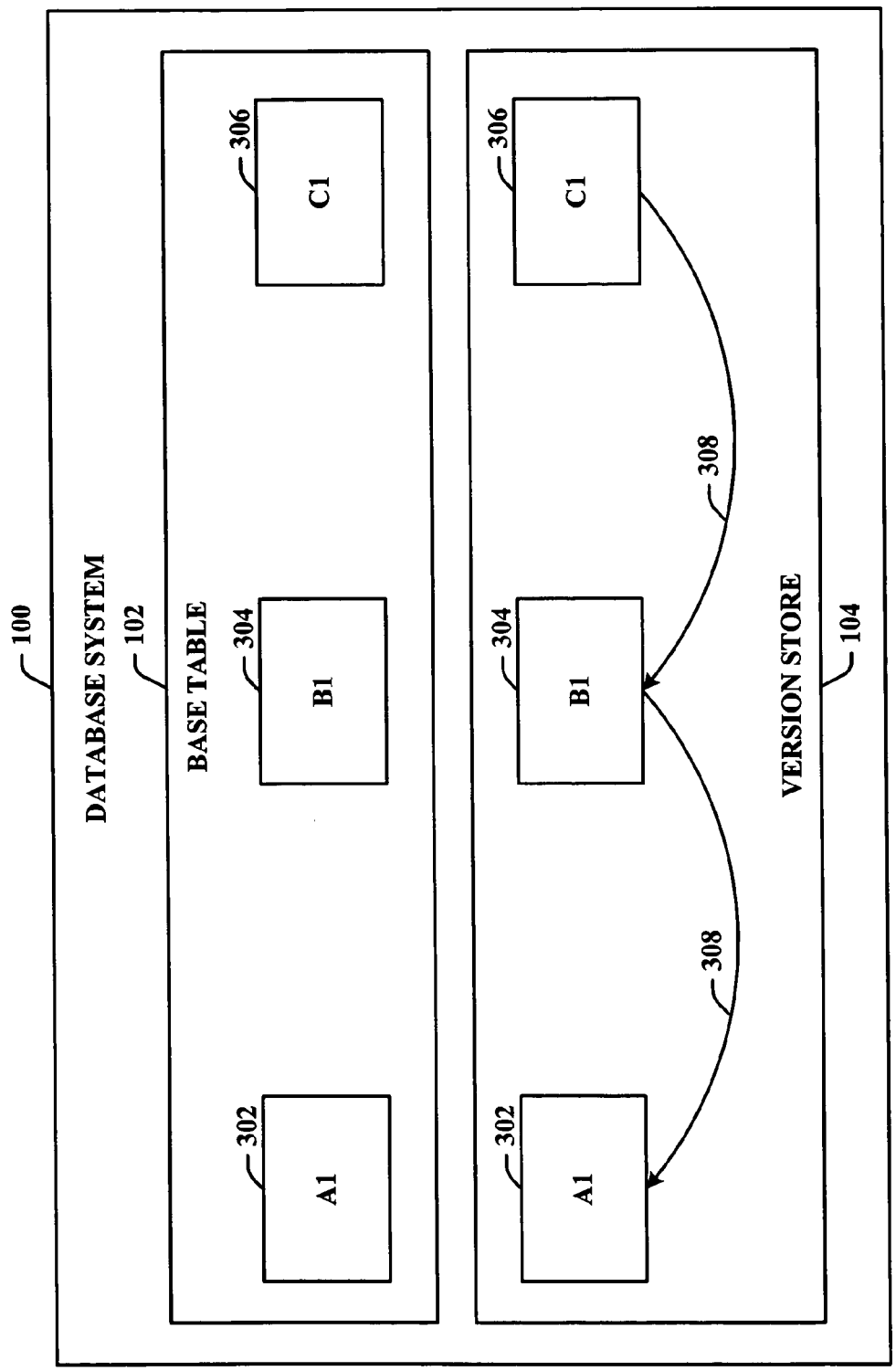
FIG. 3 illustrates a general component block diagram of a DBMS system related to a "delete" operation in accordance with an aspect of the present invention.
Figure 4:
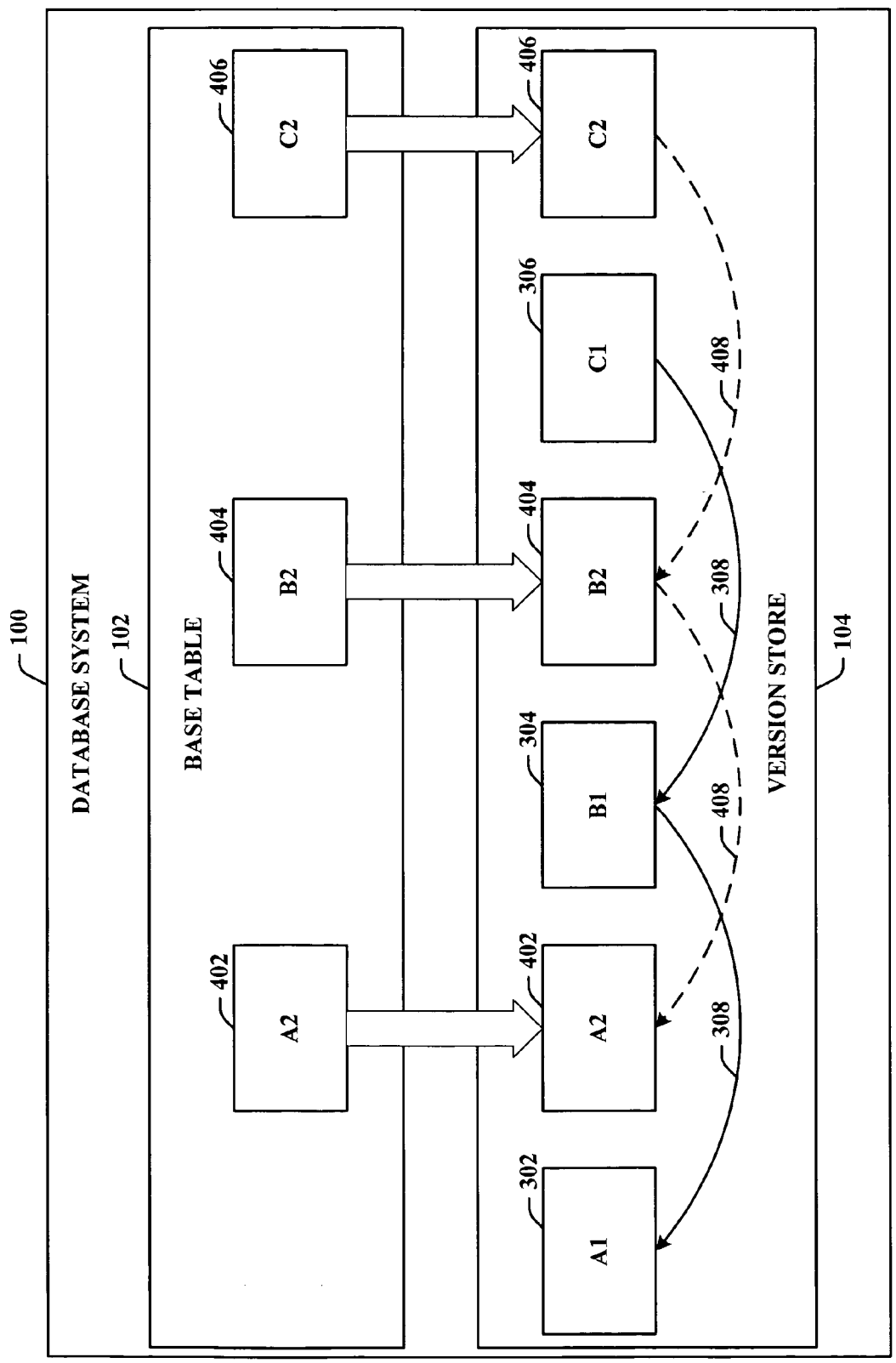
FIG. 4 illustrates a general component block diagram of a DBMS system related to a "insert" operation in accordance with an aspect of the present invention.

As previously discussed, if a row is "updated", the update statement includes a delete operation of the old image followed by an insert operation of the new image. Accordingly, the previous version of the row is stored in the "delete" table, and the current or new version of the row is stored in the "insert" table. FIGS. 3 and 4 illustrate these two operations: "delete" and "insert" respectively.

Continuing with the example, illustrated in FIG. 3 is a general block diagram of the database system 100 including the base table component 102 and the version store component 104 in accordance with an aspect of the present invention. This exemplary database system 100 is representative of the base table component 102 and version store component 104 in connection with a "delete" row procedure.

The base table component 102 can include records shown as A1, B1 and C1 (302, 304, 306). In accordance with an aspect of the present invention, a mirror image of rows A1, B1 and C1 (302, 304, 306) can also be stored in the version store component 104. The linkage 308 can be established to link the records in the version store component 104 as shown. As previously discussed, linkage 308 creates a chain of records (302, 304, 306) matching those in the base table component 102.

Another aspect of the present invention is directed to organizing and tracking records in accordance with an "insert" procedure. Continuing with the example and referring to FIG. 4, new versions of records A1, B1 and C1 (302, 304, 306) are inserted into base table component 102 as a result of a DML event. The new inserted versions are illustrated as A2, B2 and C2 (402, 404, 406) in FIG. 4. As noted above, the original versions, A1, B1 and C1 (302, 304, 306) remain in the version store linked by linkage 308. However, the new records, A2, B2, C2 (402, 404. 406) replace the original records in the base table component 102 as shown as a result of the insert operation.

In accordance with the insert procedure, the present invention can be configured to "push" a copy of the new image records, A2, B2, C2 (402, 404, 406) from the base table component 102 into the version store component 104 upon an insert event. Once the new images, A2, B2, C2 (402, 404, 406) are in the version store, a similar linkage component 408 as described with reference to FIG. 3 can be established to link the new images, A2, B2, C2 (402, 404, 406) which were created via the insert event.

Accordingly, this new linkage 408 forms a new image chain for the inserted table. It will be appreciated that inserting the new records, A2, B2, C2 (402, 404, 406) into the version store component 104 can be measurably faster than inserting the records into a conventional worktable. Thus, the efficiency of the database system 100 can be increased.

Those skilled in the art will appreciated that, in connection with the implementation of after-trigger mechanisms, if a DML statement maintains a pair of old (e.g., delete) and new (e.g., insert) image chains (308, 408), a delta worktable is not needed as in prior implementations. Thus the present system and methodology entirely avoids the cost of populating a delta worktable as well as the costs associated with joining a delta worktable and the base table. Although the example of FIG. 4 illustrates two image chains (308, 408), it will be appreciated that only for an update statement up to two image chains may be maintained as discussed herein. While for an insert and delete statement, at most one image chain will be maintained.

As noted before with reference to FIG. 2, in accordance with an aspect of the present invention, only records relevant to a trigger are linked into the chains. By way of example, because version records corresponding to a secondary index do not participate in the inserted/deleted table, they are not linked into chains. As well, in the event a trigger is not present in conjunction with a table, then the table's version records are not linked into chains.

Another aspect of the present invention provides for a linkage chain which can contain rows located in multiple tables. Those skilled in the art will appreciate that, due to cascade update, multiple tables can be updated within a single DML statement. Accordingly, if more than one table updated has a trigger, the new/old image chains (e.g., 308, 408) can link records contained within different tables.

In accordance with the present invention, changes to large object (LOB) data are not linked into the chains since LOB data can be accessed through base row. With respect to nested trigger mechanisms, the DML statement in each nesting level can maintain its own pair of new and old image chains. It will be appreciated that there can be multiple pairs of chains active for read operations, but only the pair of chains belonging to the last DML statement can be active for construction operations.

Figure 5:
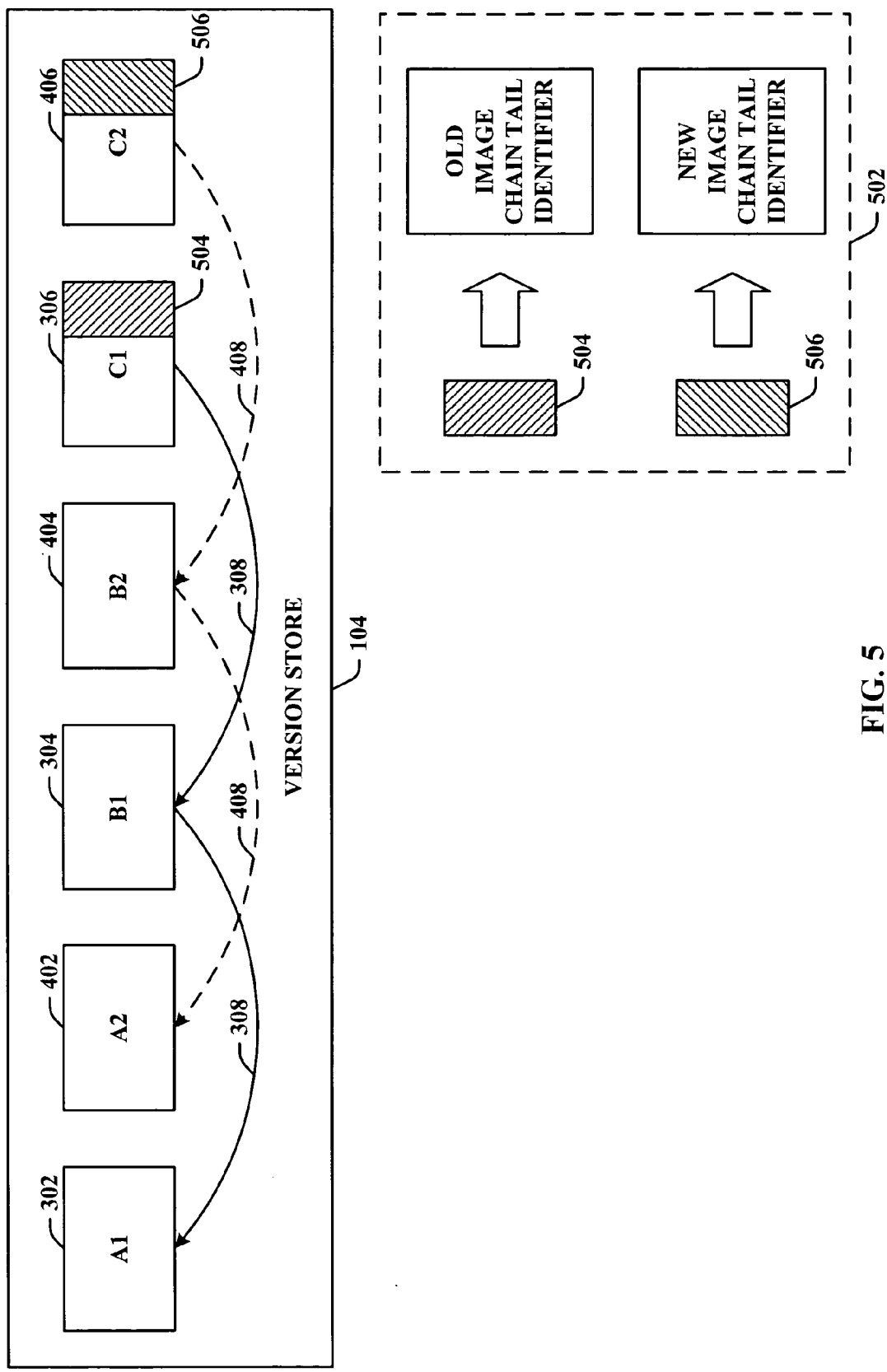
FIG. 5 illustrates a general component block diagram of a version store and related linkages in accordance with an aspect of the present invention.

With reference now to FIG. 5, the version store component 104 containing original version records A1, B1, C1 (302, 304, 306) and newly inserted version records A2, B2, C2 (402, 404, 406) is shown. As well, continuing with the example, linkages 308 and 408 representing the old and new record chains respectively can be established as described above. Once the common versions of the records are linked, an identifier of the new (408) and old (308) image chains can be stored in order to identify the records in accordance with a subsequent scanning (e.g., EVS) operation.

Illustrated in a dashed block 502 is an exemplary identification scheme. As shown, a tail identifier 504 can be employed to identify the tail of the old image chain 308 which contains the original versions, A1, B1, C1 (302, 304, 306) of the rows. Similarly, a tail identifier 506 can be employed to identify the tail of the new image chain 408 which contains the inserted versions, A2, B2, C2 (402, 404, 406) of the rows. The system can log and track of the tails (504, 506) of the new (408) and old (308) linkage chains currently active for construction. It will be appreciated that any known method of identification and/or tracking known in the art can be employed. By way of example, the tails of the chains can be stored in an Update Sequence Marker (USM).

Those skilled in the art will appreciate that an interface can be employed to inform the system whether a chain should be maintained during a DML event. For example, if there is no trigger on the table the system can be informed not to maintain a trigger. Otherwise, based on trigger body analysis the system can be informed to maintain a new image chain or old image chain or both accordingly. A scan interface can be employed to enable the system to scan rows in inserted/deleted tables by following linkage in the new and old image chains.

Figure 6:
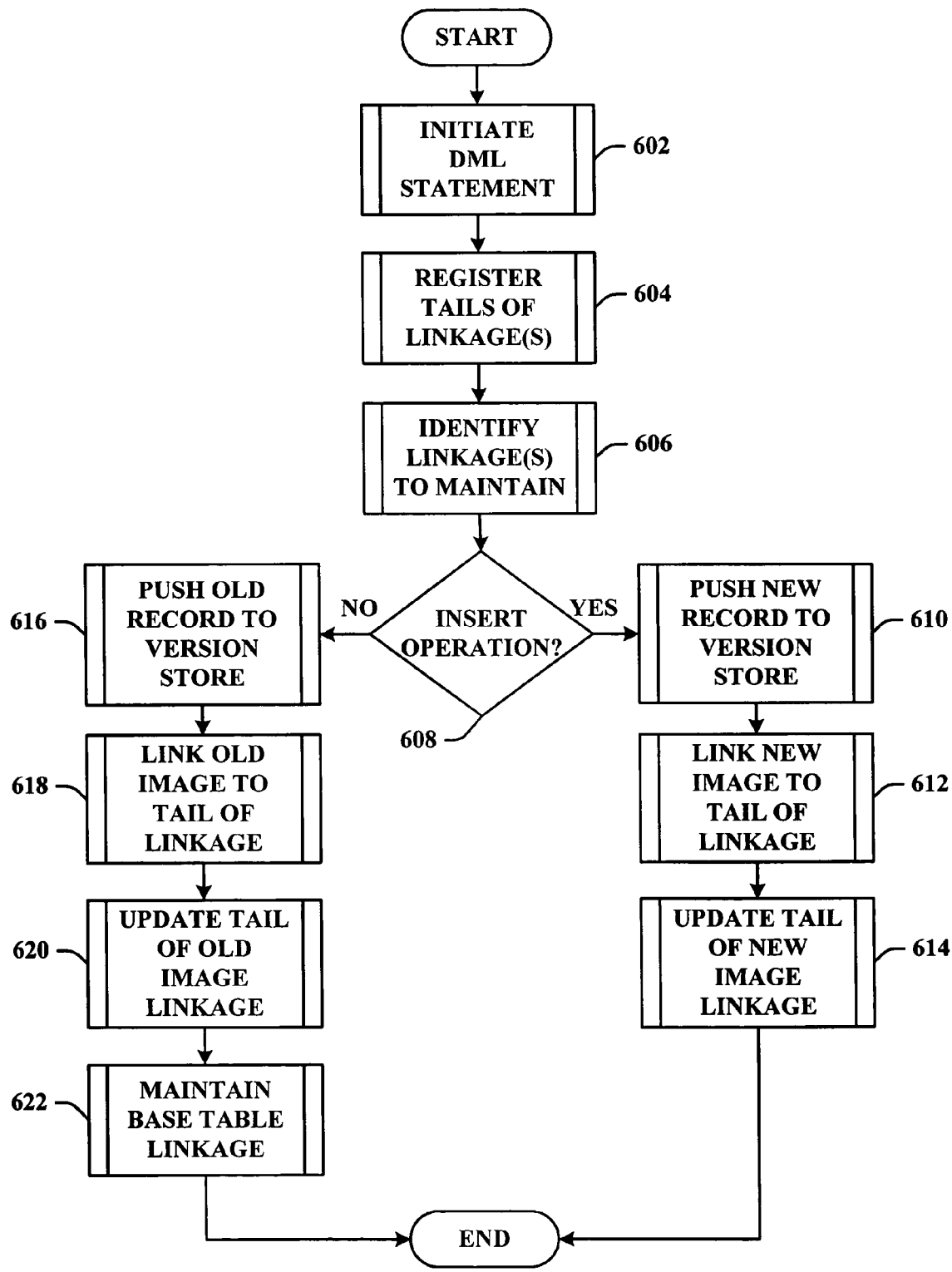
FIG. 6 illustrates one methodology to establish a linkage in accordance with an aspect of the present invention.

Turning now to the DML execution sequence, one aspect of the present invention utilizes USM's in accordance with each DML statement. Illustrated in FIG. 6 is a methodology in view of this aspect. Proceeding to 602, linkages are in place and the DML statement is started. The USM is triggered to register its tails of new and old images chains for construction at 604. It will be appreciated that the tails can be registered in any manner and in any storage device known in the art.

Next, at 606, the system can identify which specific chains should be maintained in accordance to the DML event. At 608, the system determines if the current operation is an "insert" operation. If so, the system "pushes" the new image of the record to version store at 610. Once in the version store, at 612, the new record can be linked to the current tail of the new image chain. At 614, the tail of the new image chain can be updated to point to the new record inserted.

If at 608 the system determines that the current operation is not an "insert" operation (e.g., a delete operation), the system "pushes" the old record into the version store at 616. Once in the version store, at 618, the old record can be linked to the current tail of the old image chain. At 620, the tail of the old image chain can be updated to point to the old record version. Finally, if needed, the appropriate linkages of the same key values are maintained from the deleted rows in the base tables to the old images in the version store at 622.

As illustrated, in accordance with a regular versioning operation, a linkage can be maintained from base row to versioned record in version store. As well, in a versioning operation, there may not be a need to maintain the linkage to the new image pushed to version store. Even for old images, the linkage is maintained only when needed as identified by the DML statement. Accordingly, if the new version is generated purely for a trigger's purpose, e.g., the database is not versioned and no online index is running etc., then a linkage is not maintained. This performance optimization is particularly useful for index/heap delete operations.

Figure 7:
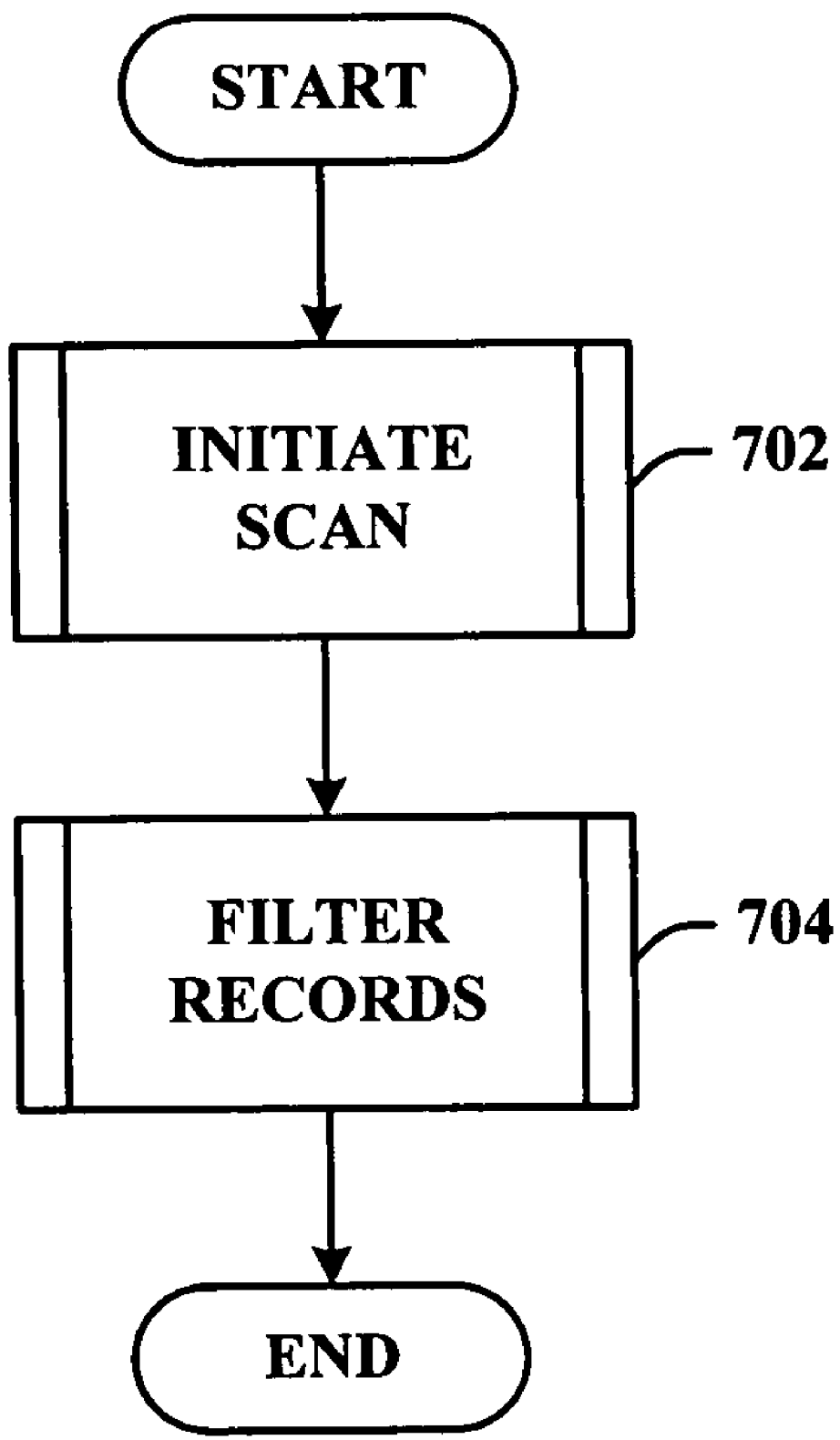
FIG. 7 illustrates one methodology to execute a triggering mechanism in accordance with an aspect of the present invention.

Turning now to trigger body execution, FIG. 7 illustrates a methodology in accordance with an aspect of the present invention. Proceeding to 702, when retrieving data from inserted/deleted tables, the system initiates a scan (e.g., EVS). In one embodiment the system passes an identifier (e.g., USM) to a scan interface. Next, at 704, the system follows the linkage in the chains and filters out records based upon table identification. For LOB data, the scan interface can construct an identifier based on the key value and in-row LOB root stored in the versioned record. The system can employ this identifier together with the USM to obtain an old/new image of a LOB column.

Figure 8:
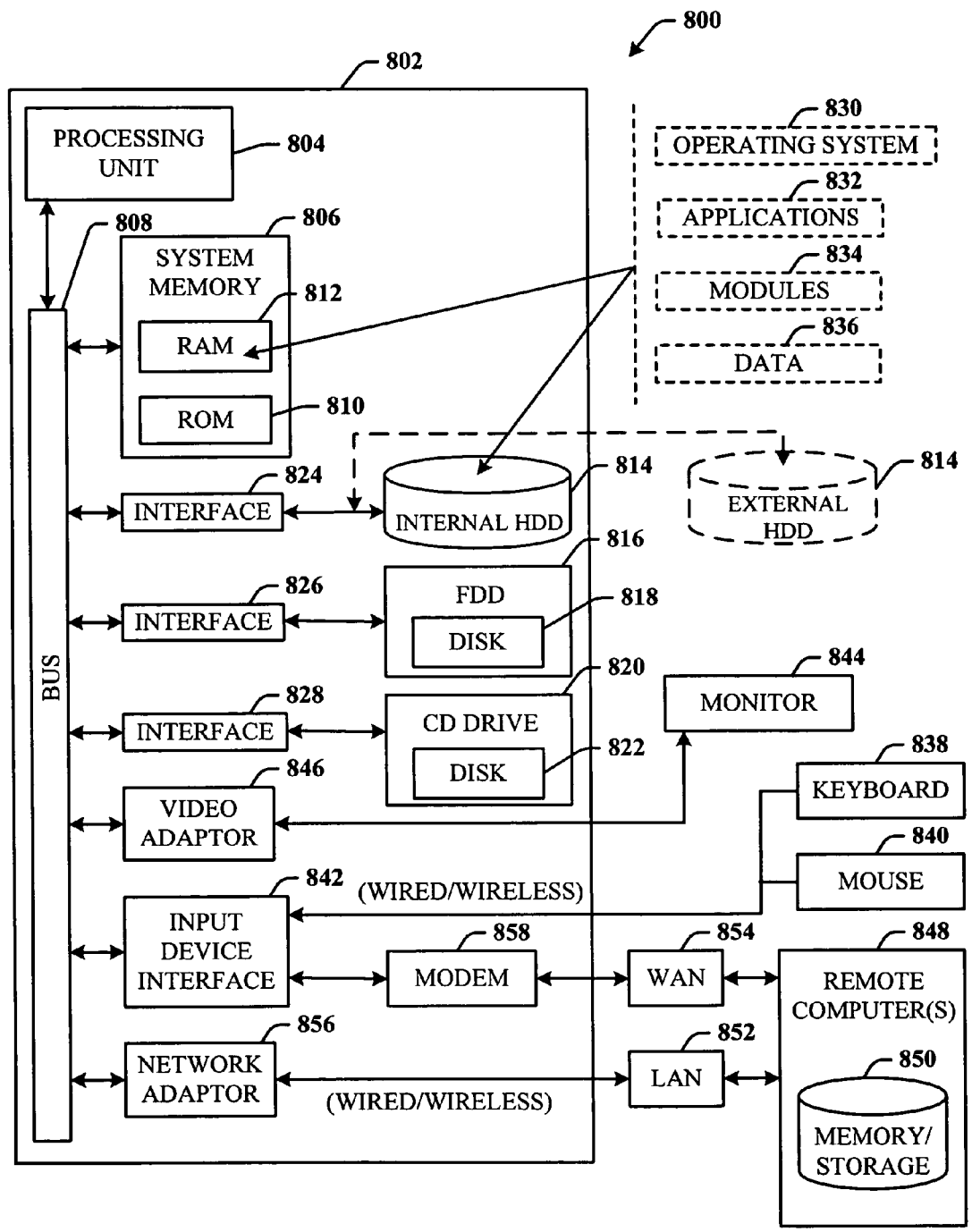
FIG. 8 illustrates a block diagram of a computer operable to execute the disclosed architecture.

Referring now to FIG. 8, there is illustrated a block diagram of a computer operable to execute the disclosed architecture. In order to provide additional context for various aspects of the present invention, FIG. 8 and the following discussion are intended to provide a brief, general description of a suitable computing environment 800 in which the various aspects of the present invention can be implemented. While the invention has been described above in the general context of computer-executable instructions that may run on one or more computers, those skilled in the art will recognize that the invention also can be implemented in combination with other program modules and/or as a combination of hardware and software.

Generally, program modules include routines, programs, components, data structures, etc., that perform particular tasks or implement particular abstract data types. Moreover, those skilled in the art will appreciate that the inventive methods can be practiced with other computer system configurations, including single-processor or multiprocessor computer systems, minicomputers, mainframe computers, as well as personal computers, hand-held computing devices, microprocessor-based or programmable consumer electronics, and the like, each of which can be operatively coupled to one or more associated devices.

The illustrated aspects of the invention may also be practiced in distributed computing environments where certain tasks are performed by remote processing devices that are linked through a communications network. In a distributed computing environment, program modules can be located in both local and remote memory storage devices.

A computer typically includes a variety of computer-readable media. Computer-readable media can be any available media that can be accessed by the computer and includes both volatile and nonvolatile media, removable and non-removable media. By way of example, and not limitation, computer readable media can comprise computer storage media and communication media. Computer storage media includes both volatile and nonvolatile, removable and non-removable media implemented in any method or technology for storage of information such as computer readable instructions, data structures, program modules or other data. Computer storage media includes, but is not limited to, RAM, ROM, EEPROM, flash memory or other memory technology, CD-ROM, digital video disk (DVD) or other optical disk storage, magnetic cassettes, magnetic tape, magnetic disk storage or other magnetic storage devices, or any other medium which can be used to store the desired information and which can be accessed by the computer.

Communication media typically embodies computer-readable instructions, data structures, program modules or other data in a modulated data signal such as a carrier wave or other transport mechanism, and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. Combinations of the any of the above should also be included within the scope of computer-readable media.

With reference again to FIG. 8, there is illustrated an exemplary environment 800 for implementing various aspects of the invention that includes a computer 802, the computer 802 including a processing unit 804, a system memory 806 and a system bus 808. The system bus 808 couples system components including, but not limited to, the system memory 806 to the processing unit 804. The processing unit 804 can be any of various commercially available processors. Dual microprocessors and other multi-processor architectures may also be employed as the processing unit 804.

The system bus 808 can be any of several types of bus structure that may further interconnect to a memory bus (with or without a memory controller), a peripheral bus, and a local bus using any of a variety of commercially available bus architectures. The system memory 806 includes read only memory (ROM) 810 and random access memory (RAM) 812. A basic input/output system (BIOS) is stored in a non-volatile memory 810 such as ROM, EPROM, EEPROM, which BIOS contains the basic routines that help to transfer information between elements within the computer 802, such as during start-up. The RAM 812 can also include a high-speed RAM such as static RAM for caching data.

The computer 802 further includes an internal hard disk drive (HDD) 814 (e.g., EIDE, SATA), which internal hard disk drive 814 may also be configured for external use in a suitable chassis (not shown), a magnetic floppy disk drive (FDD) 816, (e.g., to read from or write to a removable diskette 818) and an optical disk drive 820, (e.g., reading a CD-ROM disk 822 or, to read from or write to other high capacity optical media such as the DVD). The hard disk drive 814, magnetic disk drive 816 and optical disk drive 820 can be connected to the system bus 808 by a hard disk drive interface 824, a magnetic disk drive interface 826 and an optical drive interface 828, respectively. The interface 824 for external drive implementations includes at least one or both of Universal Serial Bus (USB) and IEEE 1394 interface technologies.

The drives and their associated computer-readable media provide nonvolatile storage of data, data structures, computer-executable instructions, and so forth. For the computer 802, the drives and media accommodate the storage of any data in a suitable digital format. Although the description of computer-readable media above refers to a HDD, a removable magnetic diskette, and a removable optical media such as a CD or DVD, it should be appreciated by those skilled in the art that other types of media which are readable by a computer, such as zip drives, magnetic cassettes, flash memory cards, cartridges, and the like, may also be used in the exemplary operating environment, and further, that any such media may contain computer-executable instructions for performing the methods of the present invention.

A number of program modules can be stored in the drives and RAM 812, including an operating system 830, one or more application programs 832, other program modules 834 and program data 836. All or portions of the operating system, applications, modules, and/or data can also be cached in the RAM 812.

It is appreciated that the present invention can be implemented with various commercially available operating systems or combinations of operating systems.

A user can enter commands and information into the computer 802 through one or more wired/wireless input devices, e.g., a keyboard 838 and a pointing device, such as a mouse 840. Other input devices (not shown) may include a microphone, an IR remote control, a joystick, a game pad, a stylus pen, touch screen, or the like. These and other input devices are often connected to the processing unit 804 through an input device interface 842 that is coupled to the system bus 808, but can be connected by other interfaces, such as a parallel port, an IEEE 1394 serial port, a game port, a USB'port, an IR interface, etc.

A monitor 844 or other type of display device is also connected to the system bus 808 via an interface, such as a video adapter 846. In addition to the monitor 844, a computer typically includes other peripheral output devices (not shown), such as speakers, printers etc.

The computer 802 may operate in a networked environment using logical connections via wired and/or wireless communications to one or more remote computers, such as a remote computer(s) 848. The remote computer(s) 848 can be a workstation, a server computer, a router, a personal computer, portable computer, microprocessor-based entertainment appliance, a peer device or other common network node, and typically includes many or all of the elements described relative to the computer 802, although, for purposes of brevity, only a memory storage device 850 is illustrated. The logical connections depicted include wired/wireless connectivity to a local area network (LAN) 852 and/or larger networks, e.g., a wide area network (WAN) 854. Such LAN and WAN networking environments are commonplace in offices, and companies, and facilitate enterprise-wide computer networks, such as intranets, all of which may connect to a global communication network, e.g., the Internet.

When used in a LAN networking environment, the computer 802 is connected to the local network 852 through a wired and/or wireless communication network interface or adapter 856. The adaptor 856 may facilitate wired or wireless communication to the LAN 852, which may also include a wireless access point disposed thereon for communicating with the wireless adaptor 856. When used in a WAN networking environment, the computer 802 can include a modem 858, or is connected to a communications server on the LAN, or has other means for establishing communications over the WAN 854, such as by way of the Internet. The modem 858, which can be internal or external and a wired or wireless device, is connected to the system bus 808 via the serial port interface 842. In a networked environment, program modules depicted relative to the computer 802, or portions thereof, can be stored in the remote memory/storage device 850. It will be appreciated that the network connections shown are exemplary and other means of establishing a communications link between the computers can be used.

The computer 802 is operable to communicate with any wireless devices or entities operatively disposed in wireless communication, e.g., a printer, scanner, desktop and/or portable computer, portable data assistant, communications satellite, any piece of equipment or location associated with a wirelessly detectable tag (e.g., a kiosk, news stand, restroom), and telephone. This includes at least Wi-Fi and Bluetooth™ wireless technologies. Thus, the communication can be a predefined structure as with conventional network or simply an ad hoc communication between at least two devices.

Wi-Fi, or Wireless Fidelity, allows connection to the Internet from a couch at home, a bed in a hotel room or a conference room at work, without wires. Wi-Fi is a wireless technology like a cell phone that enables such devices, e.g., computers, to send and receive data indoors and out; anywhere within the range of a base station. Wi-Fi networks use radio technologies called IEEE 802.11 (a, b, g, etc.) to provide secure, reliable, fast wireless connectivity. A Wi-Fi network can be used to connect computers to each other, to the Internet, and to wired networks (which use IEEE 802.3 or Ethernet). Wi-Fi networks operate in the unlicensed 2.4 and 5 GHz radio bands, with an 11 Mbps (802.11b) or 54 Mbps (802.11a) data rate or with products that contain both bands (dual band), so the networks can provide real-world performance similar to the basic 10BaseT wired Ethernet networks used in many offices.

Figure 9:
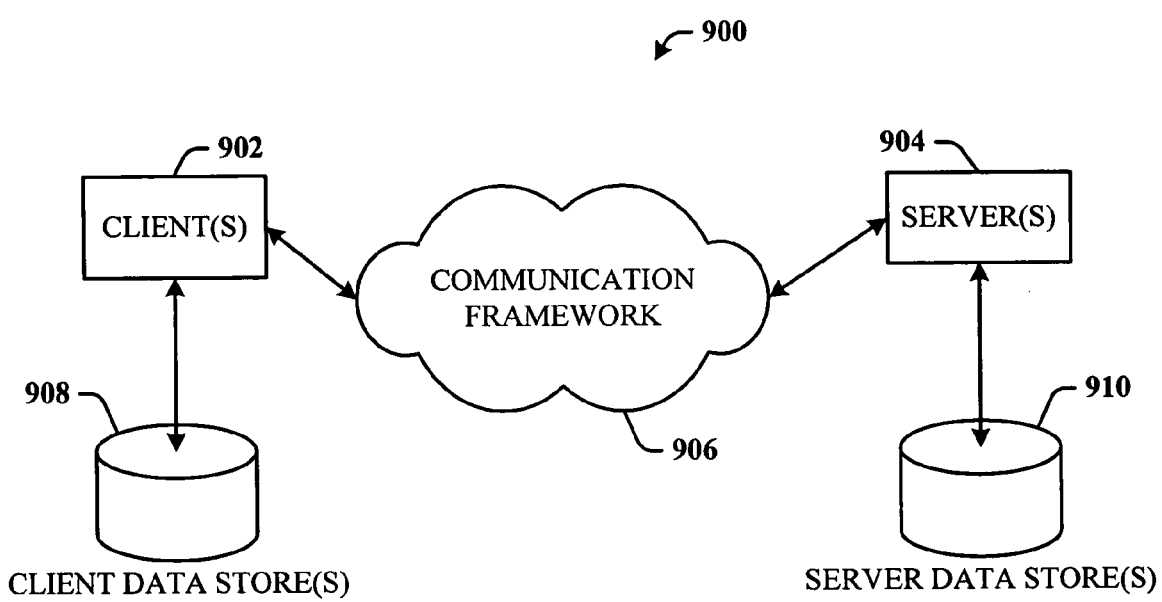
FIG. 9 illustrates a schematic block diagram of an exemplary computing environment in accordance with the present invention.

Referring now to FIG. 9, there is illustrated a schematic block diagram of an exemplary computing environment 900 in accordance with the present invention. The system 900 includes one or more client(s) 902. The client(s) 902 can be hardware and/or software (e.g., threads, processes, computing devices). The client(s) 902 can house cookie(s) and/or associated contextual information by employing the present invention, for example. The system 900 also includes one or more server(s) 904. The server(s) 904 can also be hardware and/or software (e.g., threads, processes, computing devices). The servers 904 can house threads to perform transformations by employing the present invention, for example. One possible communication between a client 902 and a server 904 can be in the form of a data packet adapted to be transmitted between two or more computer processes. The data packet may include a cookie and/or associated contextual information, for example. The system 900 includes a communication framework 906 (e.g., a global communication network such as the Internet) that can be employed to facilitate communications between the client(s) 902 and the server(s) 904.

Communications can be facilitated via a wired (including optical fiber) and/or wireless technology. The client(s) 902 are operatively connected to one or more client data store(s) 908 that can be employed to store information local to the client(s) 902 (e.g., cookie(s) and/or associated contextual information). Similarly, the server(s) 904 are operatively connected to one or more server data store(s) 910 that can be employed to store information local to the servers 904.

What has been described above includes examples of the present invention. It is, of course, not possible to describe every conceivable combination of components or methodologies for purposes of describing the present invention, but one of ordinary skill in the art may recognize that many further combinations and permutations of the present invention are possible. Accordingly, the present invention is intended to embrace all such alterations, modifications and variations that fall within the spirit and scope of the appended claims. Furthermore, to the extent that the term "includes" is used in either the detailed description or the claims, such term is intended to be inclusive in a manner similar to the term "comprising" as "comprising" is interpreted when employed as a transitional word in a claim.

What is claimed is:

1. A computer-implemented method of identifying rows modified in a database, the method comprising:
   storing a current version of rows of data in a base table;
   maintaining a copy of the current version of the data rows in a version store;
   linking a subset of the rows with the copy of the current version by registering a tail identifier that identifies the subset, to form a new image chain;
   linking a subset of rows with a previous version by registering a tail identifier that identifies the subset, to form an old image chain; and
   scanning rows in inserted/deleted tables by following linkage in the new and old image chains, to determine whether a chain should be maintained and storing the determination.

2. The method of claim 1, farther comprising pushing a new version of a subset of the rows of data into the version store.

3. The method of claim 2, farther comprising linking the new subset version of the row data having a different key value into a chain.

4. The method of claim 3, farther comprising initiating a data manipulation language (DML) event to perform at least one of a delete, insert and update procedure.

5. The method of claim 1, farther comprising determining which linkage component to maintain.

6. A computer readable medium having stored thereon computer-executable instructions to perform the acts recited in claim 1.

7. A system that facilitates identification of rows modified in a database, the system comprising:
 a base table component that stores a current version of a plurality of rows of data;
 a version store component that maintains a copy of the current version of the plurality of rows of data, the version store component including at least one linkage component that links a subset of the plurality of rows of data within the copy into a new image chain, and that links a subset of the plurality of rows of data within a previous version into an old image chain, the previous version having different key values, the linking implemented by adding a tail identifier to the end of each of the new image chain and the old image chain, the tail identifiers are registered and stored in a data store component to identify the respective version to the version store component; and
 a scan interface that the system uses to scan rows in inserted/deleted tables by following linkage in the new and old image chains to determine whether a chain should be maintained and storing the determination.

8. The system of claim 7, wherein each row in the copy of the current version of the plurality of rows of data shares a common key value with the current version of the plurality of rows of data.

9. The system of claim 7, further comprising a trigger mechanism component that scans the linkage component using the tail identifier to identify the at least one modified row in accordance to a trigger operation.

10. The system of claim 7, wherein at least one inserted row is pushed into the version store component.

11. The system of claim 10, further comprising at least one additional linkage component to link the at least one inserted row.

12. The system of claim 11, further comprising a trigger mechanism component that scans the additional linked rows to execute a procedure.

13. The system of claim 12, wherein the trigger mechanism filters the scanned records in accordance with the procedure.

14. A computer readable medium having stored thereon computer executable components of the system of claim 7.

15. A computer that employs the system of claim 7.

16. A system that identifies changes made to a database, the system comprising:
 means for retaining a current version of a plurality of rows of data;
 means for maintaining a copy of the current version of the plurality of rows of data;
 means for linking current versioned rows generated by a same data manipulation statement to form a new image chain;
 means for linking previous versioned rows generated by a different data manipulation statement to form an old image chain;
 means for adding a tail identifier to each of the new image chain and the old image chain, to identify the respective versioned rows; and
 means for storing containing each tail identifier.

17. The system of claim 16, farther comprising means for tracking a last row of each of the linked versioned rows.

18. The system of claim 17, farther comprising means for pushing an inserted row into a version store.

19. The system of claim 17, further comprising means for scanning the linked rows to identify at least one modified row in accordance with a trigger procedure.

20. The system of claim 19, further comprising means for filtering the scanned rows in accordance with the trigger procedure.

21. The system of claim 17, farther comprising means for executing a trigger procedure in response to a data manipulation event.

22. A system that executes a trigger in a database, the system comprising:
 a base table component having a current version of a plurality of rows of data in the database;
 a version store component having at least one different version of the plurality of rows of data in the database;
 at least one linkage component that links a subset of the at least one different version of the plurality of rows of data generated by a same data manipulation statement into an old image chain by adding a tail identifier that identifies a last row of the linked rows of the at least one different version;
 a data store component that stores the tail identifier; and
 a trigging mechanism component that employs the tail identifier to scan the linked rows and filters the scanned rows in accordance to a triggering procedure to produce a filtered result.

23. The system of claim 22, wherein at least one inserted row is pushed into the version store component.

24. The system of claim 23, further comprising at least one additional linkage component that links the at least one inserted row.

* * * * *